(12) United States Patent
Maruyama et al.

(10) Patent No.: US 7,972,539 B2
(45) Date of Patent: Jul. 5, 2011

(54) PROCESS FOR PRODUCING METALLIC-NANOPARTICLE INORGANIC COMPOSITE AND METALLIC-NANOPARTICLE INORGANIC COMPOSITE

(75) Inventors: Miho Maruyama, Yokohama (JP); Kenji Todori, Yokohama (JP); Tsukasa Tada, Hachioji (JP); Reiko Yoshimura, Kawasaki (JP); Yasuyuki Hotta, Tokyo (JP); Ko Yamada, Yokohama (JP); Masakazu Yamagiwa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 295 days.

(21) Appl. No.: 12/237,743

(22) Filed: Sep. 25, 2008

(65) Prior Publication Data

US 2010/0276649 A1    Nov. 4, 2010

(30) Foreign Application Priority Data

Oct. 3, 2007    (JP) ................... P2007-260107

(51) Int. Cl.
*H01B 1/00*    (2006.01)
*B44C 5/04*    (2006.01)
*B05D 3/04*    (2006.01)

(52) U.S. Cl. .............. 252/512; 252/514; 252/518.1; 428/148; 427/343

(58) Field of Classification Search .......... 252/500, 252/512, 514; 428/148; 427/343
See application file for complete search history.

(56) References Cited

U.S. PATENT DOCUMENTS

| | | | |
|---|---|---|---|
| 5,993,973 A * | 11/1999 | Lee et al. ............ | 428/433 |
| 7,253,226 B1 * | 8/2007 | Ryang ............ | 524/492 |
| 7,372,067 B2 | 5/2008 | Todori et al. | |
| 2006/0067602 A1 | 3/2006 | Todori et al. | |
| 2006/0163556 A1 | 7/2006 | Yoshimura et al. | |
| 2006/0279833 A1 | 12/2006 | Yoshimura et al. | |
| 2008/0107371 A1 | 5/2008 | Todori et al. | |
| 2008/0240652 A1 | 10/2008 | Todori et al. | |

(Continued)

FOREIGN PATENT DOCUMENTS

WO    WO 2006/137851    * 12/2006

OTHER PUBLICATIONS

Mandal et al., "Surface plasmon resonance in nanocrystalline silver particles embedded in SiO2 matrix," J. Phys. D: Appl. Phys. 35, pp. 2198-2205 (2002).*

(Continued)

*Primary Examiner* — Mark Kopec
*Assistant Examiner* — Jaison P Thomas
(74) *Attorney, Agent, or Firm* — Finnegan, Henderson, Farabow, Garrett & Dunner, L.L.P.

(57) ABSTRACT

A process for producing a metallic-nanoparticle inorganic composite 10 includes an oxide film formation step in which an oxide film 14 having micropores is formed on a substrate by a sol-gel method in which a metal alkoxide is partly hydrolyzed by the action of an acid catalyst, a tin deposition step in which the oxide film 14 is brought into contact with an acidic aqueous solution of tin chloride, an excess $Sn^{2+}$ ion removal step in which $Sn^{2+}$ ions are removed from the micropores, a metallic-nanoparticle deposition step in which the oxide film 14 is brought into contact with an aqueous solution of a metal chelate to deposit metallic nanoparticles 12 in the micropores, and an excess metal ion removal step in which metal ions are removed from the micropores; and a metallic-nanoparticle inorganic composite 10 is produced by this process.

11 Claims, 7 Drawing Sheets

U.S. PATENT DOCUMENTS

2008/0241473 A1    10/2008   Maruyama et al.
2010/0072420 A1*    3/2010   Maruyama et al. ...... 252/182.33

OTHER PUBLICATIONS

Kobayashi et al.; "Deposition of Silver Nanoparticles on Silica Spheres by Pretreatment Steps in Electroless Plating", Chem. Mater., vol. 13, pp. 1630-1633, (2001).

Zhang et al.; "Optical Properties of Au/SiO$_2$ Nano-Composite Films Prepared by Induction-Coil-Coupled Plasma Sputtering", Materials Transactions, vol. 44, No. 2, pp. 215-219, (2003).

Notice of Preliminary Rejection issued by the Korean Patent office on Oct. 15, 2010, for Korean Patent Application No. 10-2008-0097336 and English-language translation thereof.

Kobayashi, Yoshio, Deposition of Gold Nanoparticles on Silica Spheres by Electroless Metal Plating Technique, Journal of Colloid and Interface Science 283 (2005) 601-604.

* cited by examiner

SAMPLE OF EXAMPLE 1    SAMPLE OF EXAMPLE 3

PROCESS FOR PRODUCING METALLIC-NANOPARTICLE INORGANIC COMPOSITE AND METALLIC-NANOPARTICLE INORGANIC COMPOSITE

CROSS-REFERENCE TO RELATED APPLICATIONS

This application is based upon and claims the benefit of priority from the prior Japanese Patent Application No. 2007-260107, filed on Oct. 3, 2007, the entire contents of which are incorporated herein by reference.

BACKGROUND OF THE INVENTION

1. Field

The present invention relates to a process for producing a metallic-nanoparticle inorganic composite constituted of a transparent oxide, e.g., $SiO_2$, as a matrix and nanoparticles of a metal, e.g., silver, dispersed in the matrix at a high density. The invention further relates to a metallic-nanoparticle inorganic composite produced by this process.

2. Description of the Related Art

Surface plasmon is an electromagnetic mode having the property of causing electric-field localization and electric-field enhancement, and investigations on diversified applications thereof are recently being made in the fields of nanotechnology and biotechnology. One of the applications of surface plasmon is plasmon polariton in which light is transmitted with metallic nanoparticles having a size on the order of nanometer. For use in such applications, various processes for producing metallic nanoparticles are being investigated. Furthermore, investigations are being made also on the production of a two-dimensional or three-dimensional structure in place of a one-dimensional structure, in order to enhance signal intensity.

The most common process for producing a metallic-nanoparticle structure in this field is electron beam lithography. In this technique, the high-degree CMOS technology and an expensive apparatus are essential. In addition, it is basically difficult to produce a three-dimensional structure.

Besides the production processes employing electron beam lithography, the production of metallic nanoparticles based on chemical synthesis are being enthusiastically made in order to produce metallic nanoparticles at lower cost. Examples of such chemical processes are described in: a report that in the Zsigmoddy method, which is one of reduction processes, the pH of a solution was rapidly changed in a reduction step to evenly form a silver film of 10-20 nm on the surface of fine silica particles (80-180 nm) and thereby produce silver nanoshells; a report that silver particles were added to an aqueous gold chloride solution and used as a reducing agent to form gold shells on the surface of silver nanoparticles; and a report on silica spheres having silver nanoparticles evenly dispersed on the surface thereof using tin chloride as a reducing agent (see Y. Kobayashi, V. S.-Maceira and L. M. L.-Marian, "Deposition of Silver Nanoparticles on Silica Sphereres by Pretreatment Steps in Electoroless Plating," Chem. Mater., (2001), 13, pp. 1630-1633).

Although those chemical techniques can produce metallic nanoparticles, the sample is always obtained as a colloidal solution. In order fox the colloidal solution to be used as a device, it must be solidified. However, in most of the research works, no investigation has been made on a method for dispersing the nanoparticles in a transparent matrix while preventing the nanoparticles from aggregating.

There is a technique intermediate between the inexpensive chemical synthesis methods described above and the electron beam lithography having high precision. This a technique for producing an $SiO_2$ film having gold nanoparticles dispersed therein, for example, by the co-sputtering of a metal, e.g., gold, and $SiO_2$. This technique can produce a three-dimensional structure containing gold nanoparticles dispersed therein. In general, many research works are directed to a nonlinear optical material employing the local surface plasmon of, e.g., gold. Although a large amount of gold nanoparticles can be incorporated in three-dimensional arrangement into a transparent $SiO_2$ film, a heat treatment at 500° C. or higher frequently necessary after film deposition because more sputtering results in gold nanoparticles which have poor crystallinity and are not spherical (see B. Zhang, H. Masumoto, Y. Someno and T. Goto, "Optical Properties of Au/$SiO_2$ Nano-Composite Films Prepared by Induction-Coil-Coupled Plasma Sputtering," Mater. Trans., 44[2], (2003), pp. 215-219). Furthermore, the necessity of a heat treatment makes it difficult to obtain evenness of particle diameter. In addition, since a particle diameter increase due to aggregation during heating is unavoidable, it has been difficult to reduce the diameter of metallic nanoparticles to 20 nm or smaller.

As explained above, the production process based on electron beam lithography has had a problem that the cost of production is high. On the other hand, with respect to the conventional chemical synthesis methods, no technique for solidifying metallic nanoparticles has been obtained. Furthermore, in the co-sputtering method, it has been difficult to realize size reduction in metallic nanoparticles and even distribution thereof in a matrix.

BRIEF SUMMARY OF THE INVENTION

Objects of the invention may be to provide a process for producing, by a chemical synthesis method, a metallic-nanoparticle inorganic composite constituted of a solidified matrix and fine metallic nanoparticles evenly dispersed in the matrix and a metallic-nanoparticle inorganic composite produced by the process.

The invention may provide, in one aspect thereof, a process for producing a metallic-nanoparticle inorganic composite which comprises: an oxide film formation step in which an oxide film having micropores is formed on a substrate by a sol-gel method in which a metal alkoxide is partly hydrolyzed by the action of an acid catalyst; a tin deposition step in which the oxide film is brought into contact with an acidic aqueous solution of tin chloride; an excess $Sn^{2+}$ ion removal step in which $Sn^{2+}$ ions are removed from the micropores; a metallic-nanoparticle deposition step in which the oxide film is brought into contact with an aqueous solution of a metal chelate to deposit metallic nanoparticles in the micropores; and an excess metal ion removal step in which metal ions are removed from the micropores.

The invention may provide, in another aspect thereof, a metallic-nanoparticle inorganic composite which comprises: at least one oxide transparent to visible light, the oxide being selected from the group consisting of $SiO_2$, $B_2O_3$, $Al_2O_3$, $TiO_2$, $ZrO_2$, $Na_2O$, $CaO$, and $SrO$; metallic nanoparticles dispersed in the oxide and comprising at least one metal selected from the group consisting of Au, Ag, Cu, Pt, Pb, Ph, Cd, In, and Pd; and tin oxide dispersed in the oxide, wherein when the proportion of the oxide, proportion of the metallic nanoparticles, and proportion of the tin oxide are expressed by a (wt %), b (wt %), and c (wt %), respectively, then the relationships $30 \leq a \leq 70$, $20 \leq b \leq 50$, and $1 \leq c \leq 30$ are satisfied.

The embodiment of the invention can provide a process for producing, by a chemical synthesis method, a metallic-nanoparticle inorganic composite constituted of a solidified matrix and fine metallic nanoparticles evenly dispersed in the matrix. The embodiment of the invention can further provide a metallic-nanoparticle inorganic composite produced by the process.

DETAILED DESCRIPTION OF THE INVENTION

First Embodiment

The process for producing a metallic-nanoparticle inorganic composite, as a first embodiment of the invention, includes: an oxide film formation step in which an oxide film having micropores is formed on a substrate by a sol-gel method in which a metal alkoxide is partly hydrolyzed by the action of an acid catalyst; a tin deposition step in which the oxide film formed is brought into contact with an acidic aqueous solution of tin chloride; an excess $Sn^{2+}$ ion removal step in which $Sn^{2+}$ ions are removed from the micropores of the oxide film; a metallic-nanoparticle deposition step in which the oxide film is brought into contact with an aqueous solution of a metal chelate to deposit metallic nanoparticles in the micropores; and an excess metal ion removal step in which metal ions are removed from the micropores.

This embodiment of the process for producing a metallic-nanoparticle inorganic composite is explained below with respect to the case where the metal alkoxide is TEOS (tetraethoxysilane), which is an organosilane, the oxide film is an $SiO_2$ film, and the metal is silver, as an example.

First, a substrate made of quartz glass or Si (silicon) is prepared. The oxide film formation step is conducted in which TEOS is hydrolyzed by a sol-gel method using an acid catalyst, e.g., HCl, to form on the substrate a matrix which is made of $SiO_2$ and transparent to visible light. A film of a precursor solution produced from TEOS can be formed by dip coating, spin coating, etc. Examples of the catalyst include hydrochloric acid, nitric acid, sulfuric acid, and acetic acid. The reasons for the use of an acid catalyst are as follows. The acid catalyst enables the monomer to undergo polycondensation before being completely hydrolyzed. Because of this, a linear polymer having OH groups and OR groups remaining in side chains thereof is apt to be yielded. Compared to polymers yielded with basic catalysts, the linear polymer can adsorb a larger amount of $Sn^{2+}$ ions serving as a reducing agent. As a result, many metallic nanoparticles can be deposited in a later step.

Figure 2:
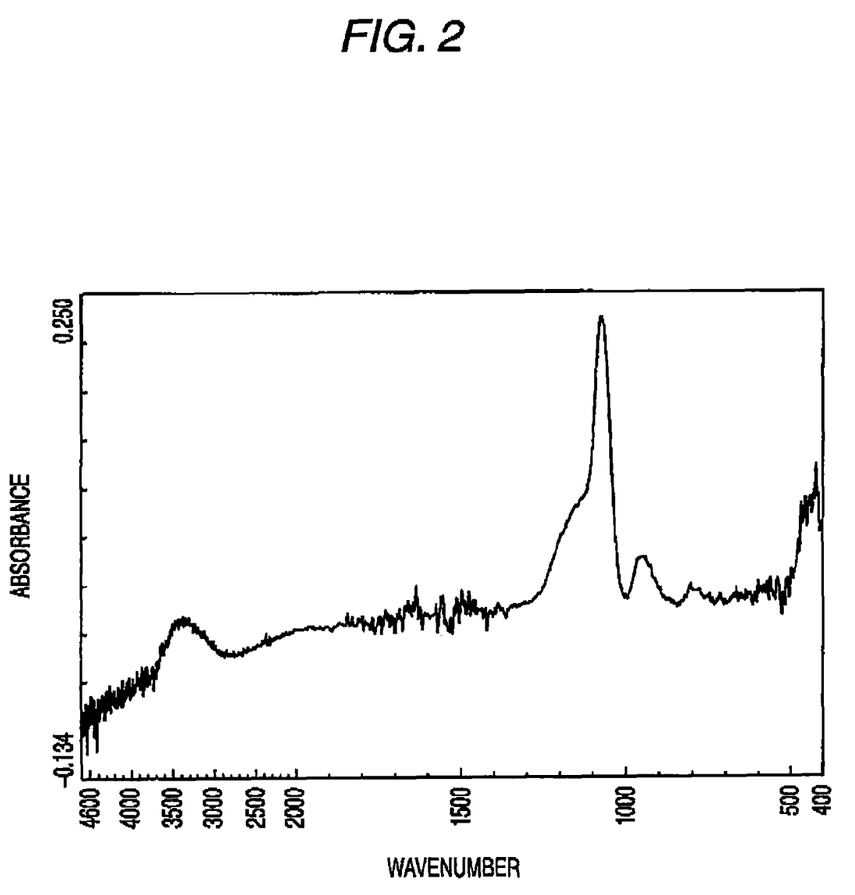
FIG. 2 is a presentation showing the IR characteristics of an $SiO_2$ film according to the first embodiment.

It is desirable to use HCl as the acid catalyst. This is because use of HCl is effective in causing a large amount of OH groups to remain. In FIG. 2 are shown the IR characteristics of an $SiO_2$ film formed with HCl as a catalyst. Peaks attributable to OH group are observed respectively at around 3,400 $cm^{-1}$ and at around 950 $cm^{-1}$. This $SiO_2$ film contains chlorine attributable to the catalyst in such a concentration that the $SiO_2/Cl$ proportion by weight is (70-180)/1.

It is desirable that the micropores in the $SiO_2$ film formed have almost pore diameters of 20 nm or smaller, desirably 5 nm or smaller, and have developed in network arrangement. This is because the possession of such micropores enables finer metallic nanoparticles to be evenly and dispersedly incorporated into the matrix in a large number.

After the oxide film formation step in which an $SiO_2$ film was formed by a sol-gel method, $Sn^{2+}$ ions serving as a reducing agent are deposited on the inner wall of the micropores of the $SiO_2$ film. Tin is supplied as an aqueous solution prepared using tin chloride, tin chloride dihydrate, or the like as a starting material. It is preferred in this operation that trifluoroacetic acid, hydrochloric acid, or the like is sufficiently added to regulate the pH of the system to 3 or lower, desirably 2 or lower, so that the tin chloride can be easily adsorbed chemically onto inner parts of the $SiO_2$ film and have high reducing power. In case where the resultant conditions include a pH higher than that, the efficiency of tin ion generation decreases.

Subsequently, the $SiO_2$ film is brought into contact with the aqueous solution containing tin chloride by immersing the film in the solution. According to need, forced impregnation such as, e.g., vacuum impregnation is conducted. Through this contact, tin ions are chemically adsorbed. This treatment is the tin deposition step.

After the tin deposition step, the $SiO_2$ film is cleaned with, e.g., distilled water in order to remove excess $Sn^{2+}$ etc. from the micropores of the $SiO_2$ film. This treatment is the excess $Sn^{2+}$ ion removal step.

After the excess $Sn^+$ ion removal step, the oxide film is subjected to the metallic-nanoparticle deposition step, in which the oxide film is brought into contact with an aqueous solution of a metal chelate to deposit metallic nanoparticles in the micropores. A metal salt is dissolved in an aqueous solution, and ammonia or another substance is then used to form a chelate. In this embodiment, silver nitrate is dissolved in an aqueous solution and ammonia water is then dropped thereinto to form a silver chelate. It is desirable in the process that the silver chelate is an $Ag(NH_3)_2^+$ chelate.

The sample which has undergone the tin deposition step is immersed in this aqueous solution containing the silver chelate. The $Sn^{2+}$ ions which have been chemically adsorbed function as a reducing agent to reduce the silver ions of the silver chelate. The silver thus reduced is deposited as nanoparticles of 20 nm or smaller in inner parts of the micropores of the $SiO_2$ film.

After the metallic-nanoparticle deposition step for silver deposition, an excess metal ion removal step is conducted in which excess metal ions such as silver chelates are removed from the micropores. For example, the excess treating liquid is removed by cleaning with distilled water or the like. In the excess metal ion removal step, excess $Sn^{2+}$ ions may be removed simultaneously.

According to this embodiment of the process for producing a metallic-nanoparticle inorganic composite, a silver-nanoparticle inorganic composite can be produced which includes $SiO_2$ which is an oxide transparent to visible light, silver nanoparticles dispersed in this oxide, and tin oxide dispersed in the $SiO_2$, and in which when the proportion of the oxide, proportion of the silver nanoparticles, and proportion of the tin oxide are expressed by a (wt %), b (wt %), and c (wt %), respectively, then the relationships $30 \leq a \leq 70$, $20 \leq b \leq 50$, and $1 \leq c \leq 30$ are satisfied.

It is desirable that the composite contains 0.1-4 wt % fluorine and 0.05-1.0 wt % chlorine.

Figure 1:
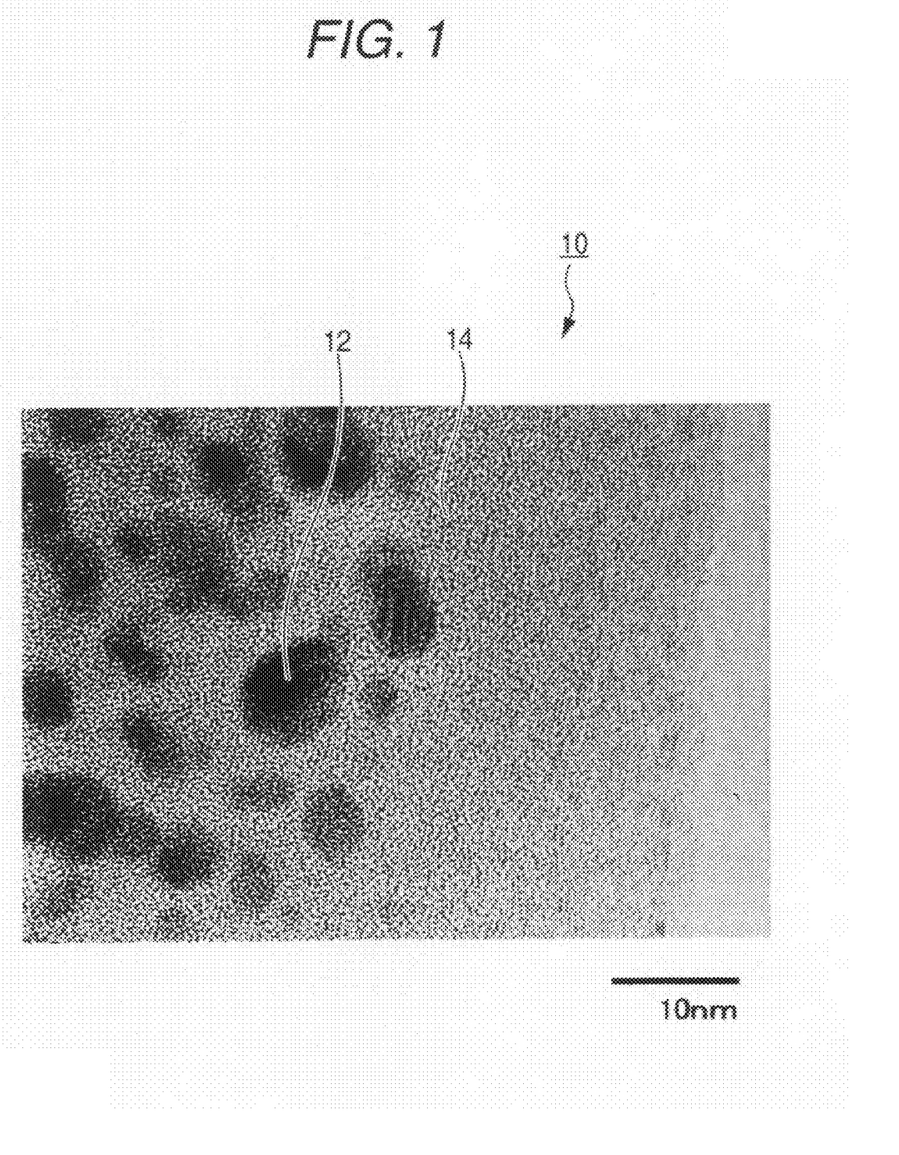
FIG. 1 is a photograph of a TEM image of a section of a silver-nanoparticle inorganic composite according to a first embodiment.

FIG. 1 is a photograph of a TEM image of a section of a silver-nanoparticle inorganic composite produced by this embodiment of the production process. It can be ascertained that in this silver-nanoparticle inorganic composite 10, silver nanoparticles 12 having a diameter of 10 nm or smaller are present at a high density in an $SiO_2$ matrix phase 14. Two or more areas were examined and, as a result, it was ascertained that the composite obtained was a transparent ceramic composite containing silver nanoparticles 12 having a diameter of 15 nm or smaller dispersed therein at a high density.

Of such silver nanoparticle/$SiO_2$ matrix systems, a silver-nanoparticle inorganic composite in which the proportion by weight among the $SiO_2$, silver, and tin oxide (30-70)/(20-50)/(1-30) has a structure highly packed with extremely fine silver nanoparticles. The silver nanoparticles in this composite have a diameter of 15 nm or smaller as stated above, and the filling factor is 15 vol % at the most.

When such a silver-nanoparticle inorganic composite examined for optical properties, clear plasmon absorption can be ascertained at around 420 nm. When a silver-nanoparticle inorganic composite according to this embodiment is produced on a prism and this composite is examined by the ATR method, then gaps shifting to the shorter-wavelength side with increasing incidence angle are observed. From the dispersion relationship among these, wave guidance by plasmon polariton is observed. Namely, this composite can be advantageously used as an optical device such as, e.g., a plasmon waveguide or a nonlinear optical material.

It is desirable in this composite that when the proportion of the oxide, proportion of the metallic nanoparticles, and proportion of the tin oxide are expressed by a (wt %), b (wt %), and c (wt %), respectively, then the relationships $30 \leq a \leq 55$, $30 \leq b \leq 50$, and $15 \leq c \leq 30$ are satisfied. More desirably, the relationships $35 \leq a \leq 45$, $35 \leq b \leq 50$, and $15 \leq c \leq 25$ are satisfied. The reason for the preference of such component proportions by weight is that this composite has a high silver concentration and, hence, shows even higher plasmon absorption.

In this embodiment of the production process, it is also effective to successively repeat the tin deposition step and the excess $Sn^{2+}$ ion removal step. This is because the repetition enhances the chemical adsorption of $Sn^{2+}$, which serves as a reducing agent, and thereby enables metallic nanoparticles to be deposited in a larger amount. The reasons for this are as follows.

Figure 3:
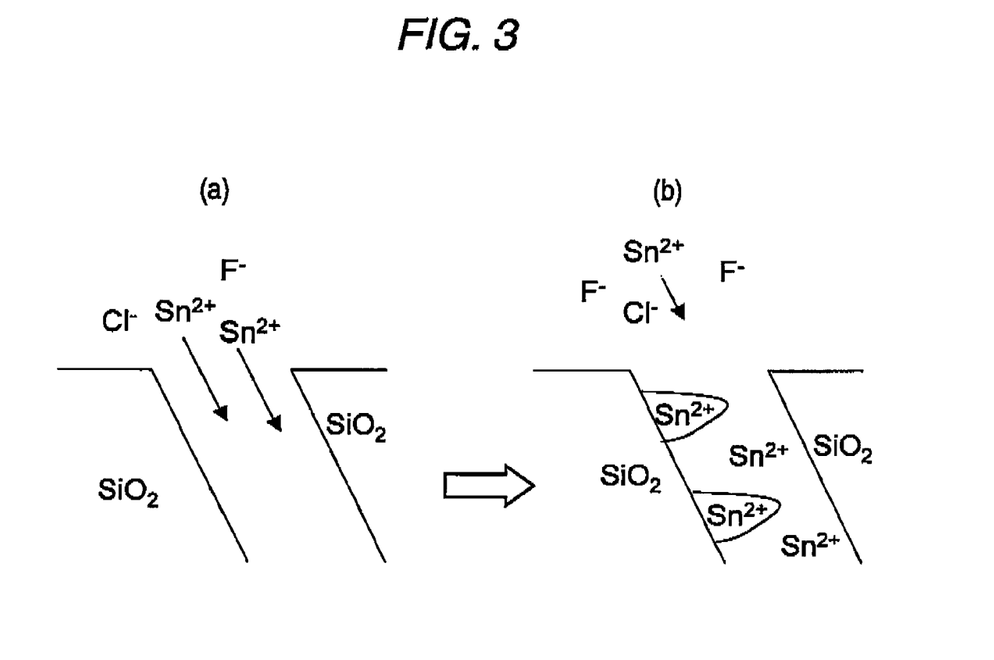
FIG. 3 is views illustrating the mechanism of chemical adsorption of $Sn^{2+}$.

FIG. 3 is views illustrating the mechanism of chemical adsorption of $Sn^{2+}$. As shown in FIG. 3, section (a), $Sn^{2+}$ ions can readily diffuse into micropores of the $SiO_2$ in an initial stage of the reaction. However, as the chemical adsorption proceeds to some degree and the $Sn^{2+}$ concentration in the micropores of the $SiO_2$ increases as shown in FIG. 3, section (b), the reaction involving the chemical adsorption of $Sn^{2+}$ comes into an equilibrium state. As a result, the $Sn^{2+}$ concentration in the micropores of the $SiO_2$ comes not to increase any more.

In this case, the tin deposition step and the excess $Sn^{2+}$ ion removal step are successively repeated to thereby reduce the $Sn^{2+}$ concentration in the micropores. First, after the tin deposition step, excess $Sn^{2+}$ ions are removed as much as possible from the micropores of the $SiO_2$ in the excess $Sn^{2+}$ ion removal step by cleaning, etc. As a result of this process, the micropores of the $SiO_2$ come into a state capable of undergoing the chemical adsorption of fresh $Sn^{2+}$ ions. Subsequently, a tin deposition step is conducted. Fresh $Sn^{2+}$ ions are chemically adsorbed, and this enables a larger amount of $Ag^+$ ions to be reduced and deposited in the subsequent step of metallic-nanoparticle deposition.

In the excess $Sn^{2+}$ ion removal step, cleaning with a solvent such as, e.g., pure water or an aqueous solution conducted. The cleaning may be accomplished by immersing the $SiO_2$ film as a sample in pure water or the like prepared beforehand in a vessel such as, e.g., a beaker. Alternatively, the cleaning may be accomplished by conducting an immersion treatment in which the sample is placed in a device in which pure water or the like is circulated through a filter or the like. This cleaning may be conducted in such a manner that running water is in direct contact with the sample surface, so long as $Sn^{2+}$ ions are removed from the micropores of the $SiO_2$.

In this embodiment of the process for producing a metallic-nanoparticle inorganic composite, it is desirable that the metal alkoxide is TEOS from the standpoints of the optical properties of the metallic-nanoparticle inorganic composite to be produced and the deposition of evenly dispersed metallic nanoparticles having a smaller size. However, the metal alkoxide should not be construed as being limited to TEOS, and other metal alkoxides can be applied. Furthermore, it is desirable that the metal constituting the metallic nanoparticles is silver from the standpoints of the optical properties of the metallic-nanoparticle inorganic composite to be produced and the deposition of evenly dispersed metallic nanoparticles having a smaller size. However, metals such as, e.g., Au, Cu, Pt, Pb, Ph, Cd, In, Pd, and the like are also applicable besides silver.

In the metallic-nanoparticle inorganic composite according to this embodiment, it is desirable that the oxide is $SiO_2$. However, the oxide should not be construed as being limited to $SiO_2$, and an oxide such as, e.g., $B_2O_3$, $Al_2O_3$, $TiO_2$, $ZrO_2$, $Na_2O$, CaO, or SrO is applicable as the matrix transparent to visible light. Furthermore, the metal constituting the metallic nanoparticles desirably is silver. However, metals such as, e.g., Au, Cu, Pt, Pb, Ph, Cd, In, Pd, and the like are also applicable besides silver.

Second Embodiment

A second embodiment of the process of the invention for producing a metallic-nanoparticle inorganic composite is basically the same as the first embodiment except that the steps ranging from the tin deposition step to the excess metal ion removal step are conducted two or more times, and that the second embodiment includes a second excess $Sn^{2+}$ ion removal step for removing $Sn^{2+}$ ions from the micropores, the second excess $Sn^{2+}$ ion removal step being conducted after the metallic-nanoparticle deposition step and before the tin deposition step. Consequently, duplicates of explanations on the same steps as in the first embodiment are omitted.

According to this embodiment, by conducting the steps ranging from the tin deposition step to the excess metal ion removal step two or more times, metallic nanoparticles can be deposited in a larger amount.

First, the steps ranging from the tin deposition step to the excess metal ion removal step are conducted in the first place in the same manner as in the first embodiment. Thereafter, a second excess $Sn^{2+}$ ion removal step for removing excess $Sn^{2+}$ ions from the micropores is conducted.

This second excess $Sn^{2+}$ ion removal step may be conducted by using a phenomenon in which the sample is held for 12 hours or longer in the silver treatment solution or an aqueous solution or is taken out of the solution and then held in the air for 12 hours or longer to thereby change the $Sn^{2+}$ ions, which are unstable, to $Sn^{4+}$ ions, which are stable. Alternatively, a method may be used in which the sample is taken out of the $Ag^+$ treatment liquid and than heated to a temperature of from 50° C. to 100° C., excluding 100° C., optionally in an aqueous solution to thereby change the $Sn^{2+}$ ions into $Sn^{4+}$ ions at an increased rate of chemical reaction. Temperatures lower than 50° C. are undesirable because a significant effect is not obtained. Temperatures not lower than 100° C. are undesirable because solution evaporation or the like occurs vigorously, resulting in a damage such as film peeling.

After this second excess $Sn^{2+}$ ion removal step, an excess metal ion removal step is conducted in which the sample is cleaned by water washing, etc. to remove excess ion species, e.g., metal ions, and contaminants from the micropores of the $SiO_2$.

Thereafter, a tin deposition step is conducted again to perform a treatment for the chemical adsorption of $Sn^{2+}$. The $Sn^{2+}$ ions chemically adsorbed onto the inner wall of the micropores of the $SiO_2$ have been changed into $Sn^{4+}$ ions, and no $Sn^{2+}$ ions are present in the $SiO_2$ micropores. Because of this, fresh $Sn^{2+}$ ions can be chemically adsorbed onto the wall of the $SiO_2$ micropores. Thereafter, an excess $Sn^{2+}$ ion removal step is conducted to remove excess $Sn^{2+}$ ions by cleaning, etc.

Subsequently, a silver nanoparticle deposition step is conducted using an $Ag^+$ chelate treatment liquid. $Ag^+$ ions are reduced by the $Sn^{2+}$ ions freshly chemically adsorbed into the $SiO_2$ micropores, whereby silver nanoparticles are deposited. This reaction occurs based on electron transfer from $Ag^+$ to $Sn^{2+}$. Because of this, the second deposition of silver nanoparticles occurs in positions different from the positions where the silver nanoparticles were deposited by the first reaction.

An optical-property examination of the sample thus produced revealed that a peak is observed at around 420 nm as in the sample produced by the process in which the steps ranging from the tin deposition step to the excess metal ion removal step were conducted only once. In the sample produced by this embodiment, plasmon absorption with a clearly increased absorbance can be ascertained.

Although the production process in which the steps ranging from the tin deposition step to the excess metal ion removal step are conducted twice was described above, these steps may be further conducted two or more times. By increasing the number of repetitions, the density of silver nanoparticles can be heightened.

When a silver-nanoparticle inorganic composite is produced on a prism by this embodiment and this composite is examined by the so-called ATR method, then gaps are observed which are attributable to plasmon polariton and have an incidence angle dependence and a polarization dependence.

As described above, it is desirable to conduct a second excess $Sn^{2+}$ ion removal step from the standpoint of sufficiently removing excess $Sn^{2+}$ ions from the micropores after the metallic-nanoparticle deposition step. However, the amount of metallic nanoparticles to be deposited can be increased also by merely conducting the steps ranging from the tin deposition step to the excess metal ion removal step two or more times. Furthermore, the second excess $Sn^{2+}$ ion removal step need not be always conducted separately from a treatment for the excess metal ion removal step, and the removal of excess $Sn^{2+}$ ions and the removal of metal ions may be conducted by the same cleaning treatment. In the case where the second excess $Sn^{2+}$ ion removal step and the excess metal ion removal step are to be conducted as separate treatments, the order of these treatments is not always fixed. The second excess $Sn^{2+}$ ion removal step may be conducted first, or the excess metal ion removal step may be conducted first.

Embodiments of the invention were explained above by reference to examples thereof. In the explanations of the embodiments of the process for producing a metallic-nanoparticle inorganic composite and of the metallic-nanoparticle inorganic composite, etc., statements were omitted with respect to parts not directly necessary for the explanation of the embodiments of the invention. However, necessary elements concerning the process for producing a metallic-nanoparticle inorganic composite or concerning the metallic-nanoparticle inorganic composite, etc. can be suitably selected and used.

All processes for producing a metallic-nanoparticle inorganic composite and all metallic-nanoparticle inorganic composites which include the elements of the embodiments of the invention and can be suitably modified by a person skilled in the art are within the scope of the invention. The scope of the invention is defined by the claims and by the scope of equivalents for the claims.

The invention will be explained below in detail by reference to Examples thereof.

Example 1

First, an $SiO_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 3 hours. The quartz glass substrate, which had dimensions of 20×50×1 mm, was washed with water, ethanol, and acetone and subsequently subjected to UV dry cleaning and then to an experiment. The precursor solution prepared was applied to the quartz glass substrate with a spinner under the conditions of 1,000 rpm×30 sec. Thereafter, this coated substrate was held at room temperature for 24 hours.

The $SiO_2$ film thus formed in this Example was examined by IR spectroscopy. As a result, peaks attributable to OH group were observed respectively at around 3,400 $cm^{-1}$ and around 950 $cm^{-1}$, these positions being almost the same as in FIG. 2. The $SiO_2$ film was analyzed by fluorescent X-ray spectroscopy for composition. As a result, the value of $SiO_2$/Cl was found to be 103/1.

A tin treatment liquid was prepared next. In 20 mL of water was dissolved 0.1 g of tin chloride. Thereafter, 0.1 mL of trifluoroacetic acid was added thereto, and the ingredients were mixed together for about 5 minutes. To 9.9 mL of ion-exchanged water was added 0.1 mL of the resultant solution. The $SiO_2$ film obtained above as a sample was immersed for about 2 hours in the treatment liquid thus produced. Thereafter, the $SiO_2$ film was taken out of the treatment liquid and cleaned with ion-exchanged water.

Subsequently, a silver treatment liquid was produced. In 20 mL of ion-exchanged water was dissolved 0.12 g of silver nitrate. Thereafter, 25% ammonia water was added dropwise thereto until the solution became transparent. To 9.9 mL of ion-exchanged water was added 0.1 mL of the resultant solution. The $SiO_2$ film was immersed for about 2 hours in the aqueous Ag(NH$_3$)$_2{}^+$ chelate solution thus produced as a treatment liquid. Thereafter, the SiO$_2$ film was taken out of the treatment liquid, cleaned with ion-exchanged water, and then dried at room temperature for about 24 hours.

Figure 4:
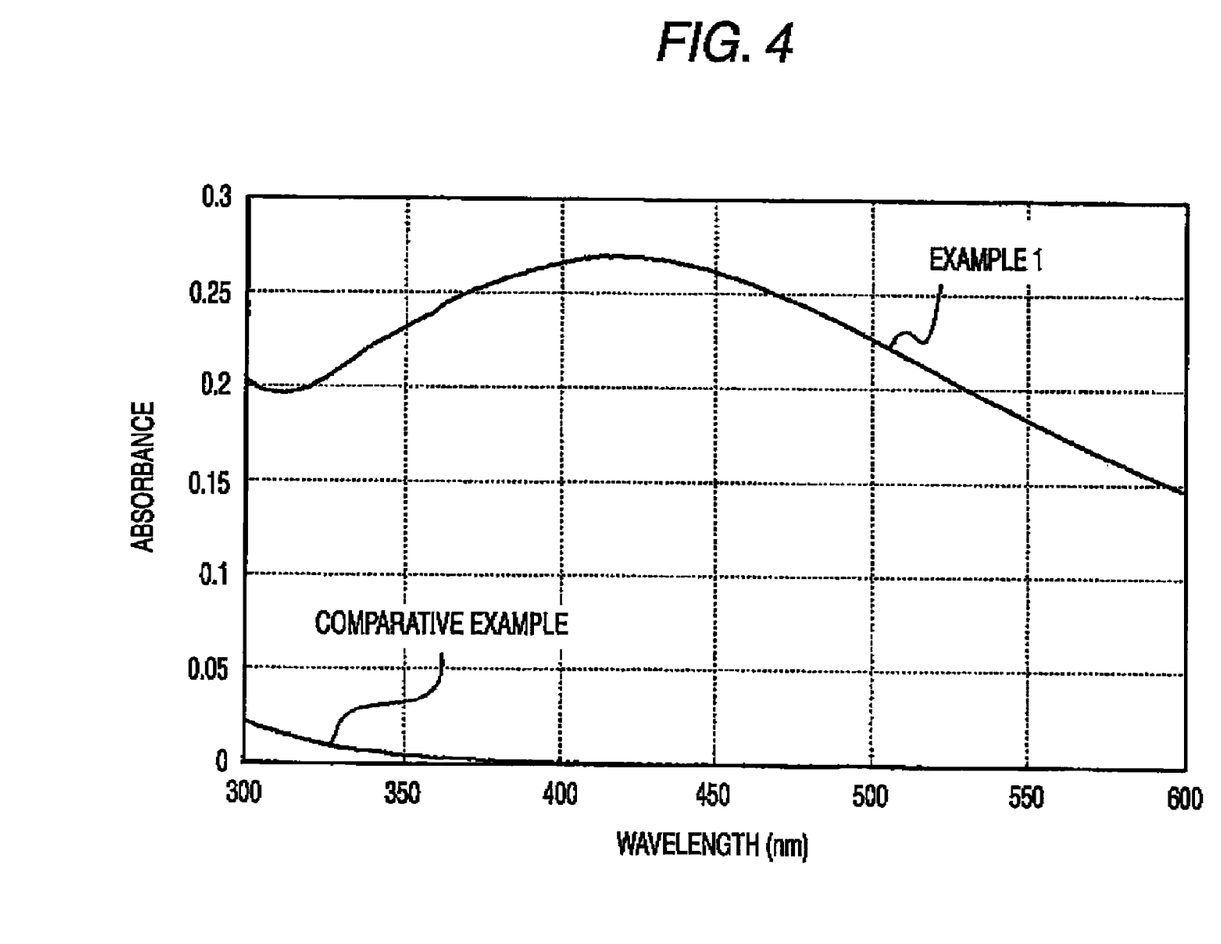
FIG. 4 is a presentation showing the results of examinations by absorption spectroscopy in Example 1 and Comparative Example.

The silver-nanoparticle inorganic composite thus produced was visually examined for color. The composite was further examined by absorption spectroscopy. The results of the absorption spectroscopy are shown in FIG. 4. In addition, the composite was analyzed by fluorescent X-ray spectroscopy for composition, and a section thereof was examined with a TEM.

Comparative Example

An SiO$_2$ film as a Comparative Example was formed using a basic catalyst. Into a separable flask were introduced 100 mL of ethanol and 10 mL of 25% ammonia water. The ingredients were mixed together at 30° C. for about 30 minutes. Subsequently, 3.5 g of TEOS was added thereto, and the ingredients were mixed together for about 3 hours. Except these, the same treatments as in Example 1 were conducted.

The silver-nanoparticle inorganic composite produced was visually examined for color as in Example 1. The composite was further examined by absorption spectroscopy. The results of the absorption spectroscopy are shown in FIG. 4.

The dried sample obtained in Example 1 had a dark brown color, whereas the sample of Comparative Example had been only slightly colored. Furthermore, as FIG. 4 shows, the sample of Example 1 showed an absorption peak at around 420 nm in the analysis by absorption spectroscopy, while no distinct absorption peak was observed in the sample of Comparative Example.

In the fluorescent X-ray analysis of the sample of the Example, the proportion by weight among the SiO$_2$, silver, and SnO$_2$ was found to be about 65/25/10. From the TEM examination of a section of the sample of the Example, it was ascertained that the same structure as in FIG. 1 had been formed. The particle diameters of the silver nanoparticles were 2-15 nm.

Example 2

An SiO$_2$ film was formed in the same manner as in Example 1. First, an SiO$_2$ film was formed on a quartz glass substrate using an acid catalyst. Into a separable flask were introduced 150 mL of ethanol, 27 mL of ion-exchanged water, and 15 mL of 1 mol/L aqueous nitric acid solution. The contents were mixed for about 15 minutes while keeping them at 30° C. Subsequently, 31 g of TEOS was added thereto, and the contents were further mixed for about 2 hours.

A tin treatment liquid was produced next. In 10 mL of water was dissolved 0.06 g of tin chloride dihydrate. Thereafter, 0.05 mL of trifluoroacetic acid was added thereto, and the ingredients were mixed together for about 30 minutes. To 19.8 mL of ion-exchanged water was added 0.2 mL of the resultant solution. The sample was immersed for about 1 hour in the treatment liquid thus produced. Thereafter, the sample was taken out of the treatment liquid and cleaned with ion-exchanged water. Furthermore, this sample was cleaned by immersing it for about 1 hour in ion-exchanged water placed in a beaker.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 19.8 mL of ion-exchanged water was added 0.2 mL of the resultant solution. The sample was immersed for about 1 hour in the treatment liquid thus produced. Thereafter, the sample was taken out of the treatment liquid, cleaned with ion-exchanged water, and than dried at room temperature for about 24 hours.

The dried sample of this Example had a dark brown color as in Example 1. This sample was further examined by absorption spectroscopy in the same manner as in Example 1. As a result, an absorption peak was observed at around 415 nm.

Example 3

An SiO$_2$ film was formed in the same manner as in Example 1. First, an SiO$_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 3 hours. The quartz glass substrate, which had dimensions of 20×50×1 mm, was washed with water, ethanol, and acetone and subsequently subjected to UV dry cleaning and then to an experiment. The precursor solution prepared was applied to the quarts glass substrate with a spinner under the conditions of 2,000 rpm×30 sec. Thereafter, this coated substrate was held at room temperature for 24 hours.

Next, a tin treatment liquid was first produced. In 20 mL of water was dissolved 0.1 g of tin chloride dihydrate. Thereafter, 0.1 mL of trifluoroacetic acid was added thereto, and the ingredients were mixed together for about 5 minutes. To 9.9 mL of ion-exchanged water was added 0.1 mL of the resultant solution. The sample of the embodiment of the invention and a comparative material were immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 9.9 mL of ion-exchanged water was added 0.1 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker. Thus, a first process beginning with the tin deposition step and ending with the excess metal ion removal step was completed.

Subsequently, a second process beginning with a tin deposition step and ending with an excess metal ion removal step was conducted.

As in the first process, 0.1 mL of the tin treatment liquid produced above was added to 9.9 mL of ion-exchanged water. The sample of the embodiment of the invention and the comparative material were immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

Subsequently, 0.1 mL of the silver treatment liquid produced above was added to 9.9 mL of ion-exchanged water. The sample was immersed for about 30 minutes in the treatment liquid thus produced. This sample was cleaned with ion-exchanged water and than dried at room temperature for about 24 hours.

Figure 5:
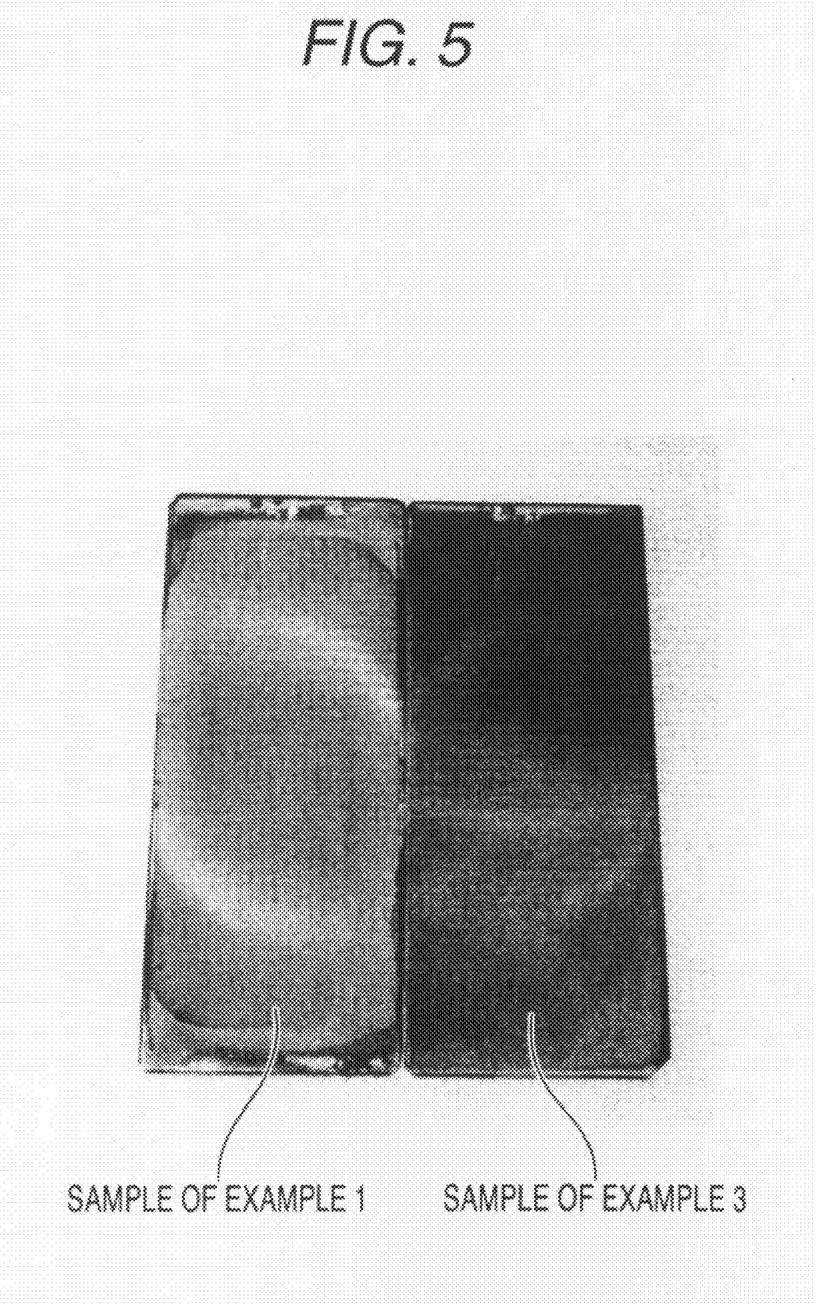
FIG. 5 is a photograph showing the appearances of the samples of Example 1 and Example 3.
Figure 6:
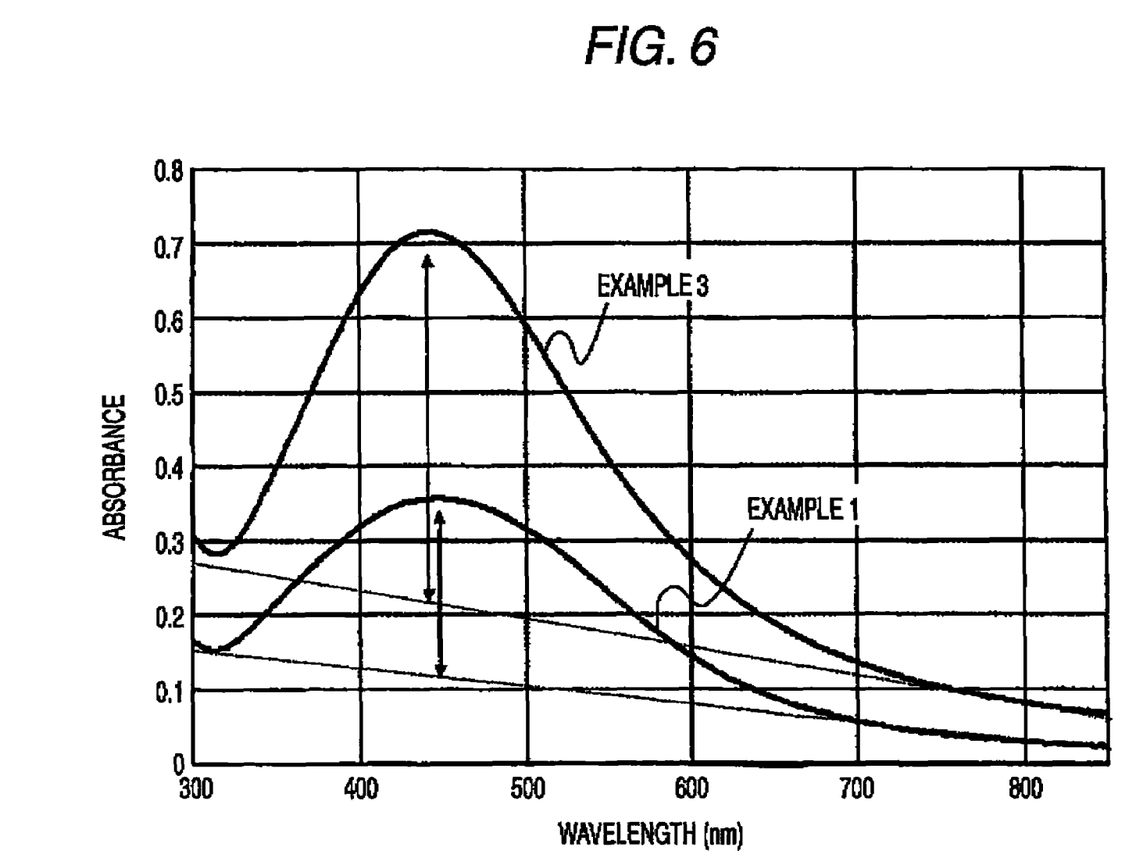
FIG. 6 is a presentation showing the results of examinations by absorption spectroscopy in Example 1 and Example 3.

The appearance of the sample of Example 1, in which the steps ranging from a tin deposition step to an excess metal ion removal step were conducted once, and the appearance of the sample produced in Example 3, in which these steps were conducted twice, are shown in FIG. 5. The sample of Example 3 had a darker brown color. These samples were examined by absorption spectroscopy. The results obtained are shown in FIG. 6. Although both samples showed an absorption peak at around 420 nm, the sample of Example 3 had an absorbance about two times the absorbance of the sample of Example 1. This indicates that the sample of Example 3 was filled with a larger amount of silver nanoparticles.

The sample of this Example was analyzed by fluorescent X-ray spectroscopy for composition. As a result, the proportions of silver and $SnO_2$ were found to be 40 wt % and 20 wt %, respectively. Namely, the proportion by weight among the $SiO_2$, silver, and $SnO_2$ was found to be about 45/30/25. Furthermore, the contents of fluorine and chlorine were 2.5 wt % and 0.3 wt %, respectively.

The film (silver-nanoparticle inorganic composite) according to this Example was formed on a prism and examined by the so-called ATR method. As a result, gaps attributable to plasmon polariton and having an incidence angle dependence and a polarization dependence were observed.

Example 4

An $SiO_2$ film was formed in the same manner as in Example 1. First, an $SiO_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 3 hours. The quartz glass substrate, which had dimensions of 20×50×1 mm, was washed with water, ethanol, and acetone and subsequently subjected to UV dry cleaning and then to an experiment. The precursor solution prepared was applied to the quartz glass substrate with a spinner under the conditions of 1,000 rpm×30 sec. Thereafter, this coated substrate was held at room temperature for 24 hours.

Next, a tin treatment liquid was first produced. In 20 mL of water was dissolved 0.1 g of tin chloride. Thereafter, 0.1 mL of trifluoroacetic acid was added thereto, and the ingredients were mixed together for about 5 minutes. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

A treatment with a tin treatment liquid was conducted again. First, a tin treatment liquid was produced. In 20 mL of water was dissolved 0.1 g of tin chloride. Thereafter, 0.1 mL of trifluoroacetic acid was added thereto, and the ingredients were mixed together for about 5 minutes. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker. Thus, a first process beginning with the tin deposition step and ending with the excess metal ion removal step was completed.

Subsequently, a second process beginning with a tin deposition step and ending with an excess metal ion removal step was conducted.

As in the first process, 0.2 mL of the tin treatment liquid produced above was added to 19.8 mL of ion-exchanged water. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

Thereafter, a treatment with a tin treatment liquid was conducted again. First, a tin treatment liquid was produced. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 30 minutes in ion-exchanged water placed in another beaker.

Subsequently, 0.2 mL of the silver treatment liquid produced above was added to 19.8 mL of ion-exchanged water. The sample was immersed for about 30 minutes in the treatment liquid thus produced. This sample was cleaned with ion-exchanged water and then dried at room temperature for about 24 hours.

The sample thus produced had a darker brown color than the samples of Examples 1 and 2.

Example 5

An $SiO_2$ film was formed in the same manner as in Example 1. First, an $SiO_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 3 hours. The quartz glass substrate, which had dimensions of 20×50×1 mm, was washed with water, ethanol, and acetone and subsequently subjected to UV dry cleaning and then to an experiment. The precursor solution prepared was applied to the quartz glass substrate with a spinner under the conditions of 1,000 rpm×30 sec. Thereafter, this coated substrate was held at room temperature for 24 hours.

Figure 7:
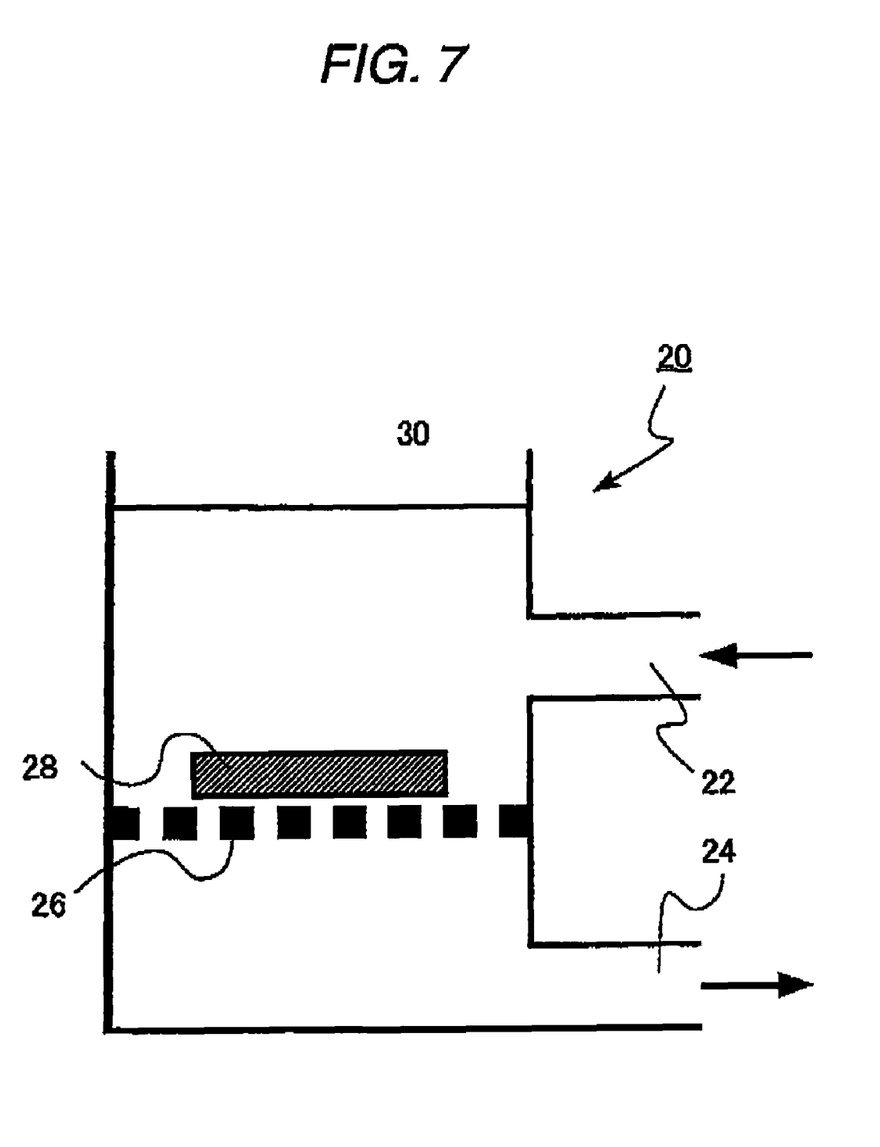
FIG. 7 is a diagrammatic view of the cleaning device used in Example 5.

Next, a tin treatment liquid was first produced. In 20 mL of water was dissolved 0.1 g of tin chloride. Thereafter, 0.1 mL of trifluoroacetic acid was added thereto, and the ingredients were mixed together for about 5 minutes. To 9.9 mL of ion-exchanged water was added 0.1 mL of the resultant solution. The sample was immersed for about 30 minutes in the treatment liquid thus produced. Thereafter, the sample was taken out of the treatment liquid. FIG. 7 diagrammatically shows the cleaning device used in this Example. This cleaning device 20 has a capacity of 800 mL, and has such a constitution that distilled water 30 flows in through an inflow opening 22 formed in an upper part and the distilled water is discharged through a discharge opening 24 foamed in a lower part. The sample 28 was inserted in this cleaning device 20 and placed on a sample-holding net table 26 in the device, and distilled water was kept flowing for 30 minutes to clean the sample.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 9.9 mL of ion-exchanged water was added 0.1 mL of the resultant solution. The sample was immersed for about 30 minutes in the treatment liquid thus produced. Thereafter, the sample was taken out of the treatment liquid. This sample was cleaned by placing it on the net-form sample table in the cleaning device and keeping distilled water flowing for 30 minutes. Thus, a first process beginning with the tin deposition step and ending with the excess metal ion removal step was completed.

Subsequently, a second process beginning with a tin deposition step and ending with an excess metal ion removal step was conducted.

As in the first process, 0.1 mL, of the tin treatment liquid produced above was added to 9.9 mL of ion-exchanged water. The sample was immersed for about 30 minutes in the treatment liquid thus produced. Thereafter, the sample was taken out of the treatment liquid. This sample was cleaned by placing it on the net-form sample table in the cleaning device shown in FIG. 7 and keeping distilled water flowing for 30 minutes.

Subsequently, 0.1 mL of the silver treatment liquid produced above was added to 9.9 mL of ion-exchanged water. The sample was immersed for about 30 minutes in the treatment liquid thus produced. This sample was cleaned with ion-exchanged water and then dried at room temperature for about 24 hours.

The sample produced in Example 5 was compared with the samples of Examples 1 and 2, which had been produced without using the device shown in FIG. 7 for cleaning. As a result, the sample of Example 5 was found to have a darken brown color.

Example 6

An $SiO_2$ film was formed in the same manner as in Example 1. First, an $SiO_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 3 hours. The quartz glass substrate, which had dimensions of 20×50×1 mm, was washed with water, ethanol, and acetone and subsequently subjected to UV dry cleaning and then to an experiment. The precursor solution prepared was applied to the quartz glass substrate with a spinner under the conditions of 2,000 rpm×30 sec. Thereafter, this coated substrate was held at room temperature for 24 hours.

Next, a tin treatment liquid was first produced. In 20 mL of water was dissolved 0.1 g of tin chloride. Thereafter, 0.1 mL of trifluoroacetic acid was added thereto, and the ingredients were mixed together for about 5 minutes. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 10 minutes in ion-exchanged water placed in another beaker.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 20 hours in ion-exchanged water placed in another beaker. Thus, a first process beginning with the tin deposition step and ending with the excess metal ion removal step was completed.

Subsequently, a second process beginning with a tin deposition step and ending with an excess metal ion removal step was conducted.

As in the first process, 0.2 mL of the tin treatment liquid produced was added to 19.8 mL of ion-exchanged water. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 10 minutes in ion-exchanged water placed in another beaker.

Subsequently, 0.2 mL of the silver treatment liquid produced in the same manner as in the first process was added to 19.8 mL of ion-exchanged water. The sample was immersed for about 30 minutes in the treatment liquid thus produced. This sample was cleaned with ion-exchanged water and then dried at room temperature for about 24 hours.

The sample of this Example had a darker brown color than the samples of Examples 1 and 2.

Example 7

An $SiO_2$ film was formed in the same manner as in Example 1. First, an $SiO_2$ film was formed on a quartz glass substrate using an acid catalyst. Into a separable flask were introduced 100 mL of ethanol, 20 mL of ion-exchanged water, and 10 mL of 1 mol/L aqueous hydrochloric acid solution. The contents were mixed for about 30 minutes while keeping them at 30° C. Subsequently, 21 g of TEOS was added thereto, and the contents were further mixed for about 4 hours. The quartz glass substrate, which had dimensions of 20×50×1 mm, was washed with water, ethanol, and acetone and subsequently subjected to UV dry cleaning and then to an experiment. The precursor solution prepared was applied to the quartz glass substrata with a spinner under the conditions of 1,000 rpm×30 sec. Thereafter, this coated substrate was held at room temperature for 24 hours.

Next, a tin treatment liquid was first produced. In 20 mL of water was dissolved 0.1 g of tin chloride. Thereafter, 0.1 mL of trifluoroacetic acid was added thereto, and the ingredients were mixed together for about 5 minutes. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 10 minutes in ion-exchanged water placed in another beaker.

Subsequently, a silver treatment liquid was first produced. In 20 mL of ion-exchanged water was dissolved 0.12 g of silver nitrate. Thereafter, 25% ammonia water was added dropwise thereto until the solution became transparent. To 19.8 mL of ion-exchanged water was added 0.2 mL of the resultant solution. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. Then this sample was put into humidifier oven and heated at 70° C. for 30 minutes. Thus, a first process beginning with the tin deposition step and ending with the excess metal ion removal step was completed.

Subsequently, a second process beginning with a tin deposition step and ending with an excess metal ion removal step was conducted.

As in the first process, 0.2 mL of the tin treatment liquid produced was added to 19.8 mL of ion-exchanged water. The sample was immersed for about 30 minutes in the treatment liquid thus produced. Thereafter, the sample was taken out of the treatment liquid. This sample was cleaned by placing it in a beaker containing 500 mL of ion-exchanged water and gently moving the sample in the water. This sample was then immersed for 10 minutes in ion-exchanged water placed in another beaker.

Subsequently, 0.2 mL of the silver treatment liquid produced in the same manner as in the first process was added to 19.8 mL of ion-exchanged water. The sample of the embodiment of the invention and a comparative material were immersed for about 30 minutes in the treatment liquid thus produced. The sample and the comparative material were cleaned with ion-exchanged water and then dried at roam temperature for about 24 hours.

The sample of this Example had a darker brown color than the samples of Examples 1 and 2.

Example 8

First, an $Al_2O_3$ film was formed on a quartz glass substrate using an acid catalyst. Into a separable flask were introduced 150 mL of ethanol, 27 mL of ion-exchanged water, and 15 mL of 1 mol/L aqueous nitric acid solution. The contents were mixed for about 15 minutes while keeping them at 30° C. Subsequently, 21 g of $Al(OC_3H_7)_3$ was added thereto, and the contents were further mixed for about 2 hours.

Next, a tin treatment liquid was produced first. In 10 mL of water was dissolved 0.06 g of tin chloride dihydrate. Thereafter, 0.05 mL of trifluoroacetic acid was added thereto, and the ingredients were mixed together for about 30 minutes. To 19.8 mL of ion-exchanged water was added 0.2 mL of the resultant solution. The sample was immersed for about 1 hour in the treatment liquid thus produced. Thereafter, the sample was taken out of the treatment liquid and cleaned with ion-exchanged water. Furthermore, this sample was cleaned by immersing it for about 1 hour in ion-exchanged water placed in a beaker.

Subsequently, a gold chelate solution was first produced. To 19.8 mL of ion-exchanged water was added 0.2 mL of the solution. The sample was immersed for about 1 hour in the treatment liquid thus produced. Thereafter, the sample was taken out of the treatment liquid, cleaned with ion-exchanged water, and then dried at room temperature for about 24 hours.

The dried sample had a reddish crimson color. This sample was examined by absorption spectroscopy. As a result, an absorption peak was observed at around 530 nm.

It has become obvious from the Examples and Comparative Example given above that a structure constituted of a film of a transparent ceramic and metallic nanoparticles dispersed in the film at a high density without aggregating can be produced by using the embodiment of the invention. A metallic-nanoparticle inorganic composite having such a structure shows plasmon absorption characteristics, and is a structure preferable for use as optical devices such as nonlinear optical films and plasmon optical waveguides.

What is claimed is:

1. A process for producing a metallic-nanoparticle inorganic composite which comprises
an oxide film formation step in which an oxide film having micropores is formed on a substrate by a sol-gel method in which a metal alkoxide is partly hydrolyzed by the action of an acid catalyst;
a tin deposition step in which the oxide film is brought into contact with an acidic aqueous solution of tin chloride;
an excess $Sn^{2+}$ ion removal step in which $Sn^{2+}$ ions are removed from the micropores;
a metallic-nanoparticle deposition step in which the oxide film is brought into contact with an aqueous solution of a metal chelate to deposit metallic nanoparticles in the micropores; and
an excess metal ion removal step in which metal ions are removed from the micropores thereby allowing for the subsequent formation of additional metallic nanoparticles.

2. The process of claim 1, wherein at least two steps among the steps ranging from the tin deposition step to the excess metal ion removal step are conducted two or more times.

3. The process of claim 2, which includes a second excess $Sn^{2+}$ ion removal step for removing $Sn^{2+}$ ion from the micropores, the second excess Sn+ ion removal step being conducted after the metallic-nanoparticle deposition step and before the tin deposition step.

4. The process of claim 3, wherein the second excess $Sn^{2+}$ ion removal step is a treatment in which after the metallic-nanoparticle deposition step, the oxide film is held in a solution or in the air for 12 hours or longer to thereby change the $Sn^{2+}$ ions into $Sn^{4+}$ ions.

5. The process of claim 3, wherein the second excess $Sn^{2+}$ ion removal step is a treatment in which after the metallic-nanoparticle deposition step, the oxide film is heated at a temperature of from 50° C. to 100° C., excluding 100° C., to thereby change the $Sn^{2+}$ ions into $Sn^{4+}$ ions.

6. The process of claim 1, wherein the tin deposition step and the excess $Sn^{2+}$ ion removal step are successively repeated.

7. The process of claim 1, wherein the excess $Sn^{2+}$ ion removal step is a treatment in which the oxide film is immersed in water or an aqueous solution.

8. The process of claim 1, wherein the excess $Sn^{2+}$ ion removal step is a treatment in which the oxide film is immersed in water or an aqueous solution in a device in which the water or aqueous solution circulates.

9. The process of claim 1, wherein the metal alkoxide is an organosilane and the oxide film is an $SiO_2$ film.

10. The process of claim 1, wherein the aqueous solution of a metal chelate is an aqueous $Ag(NH_3)_2^+$ chelate solution prepared from a silver salt and an aqueous solution containing ammonia.

11. The process of claim 9, wherein the $SiO_2$ film after the $SiO_2$ film formation step shows peaks attributable to OH group respectively at around 3,400 $cm^{-1}$ and at around 950 $cm^{-1}$ when examined by IR spectroscopy, the $SiO_2$ film contains chlorine in such a concentration as to result in an $SiO_2$/Cl proportion by weight of (70-180)/1, and the micropores have almost pore diameters of 20 nm or smaller and have developed in network arrangement.

* * * * *